H. MOORE.
Oat-Separators.
No. 158,112. Patented Dec. 22, 1874.
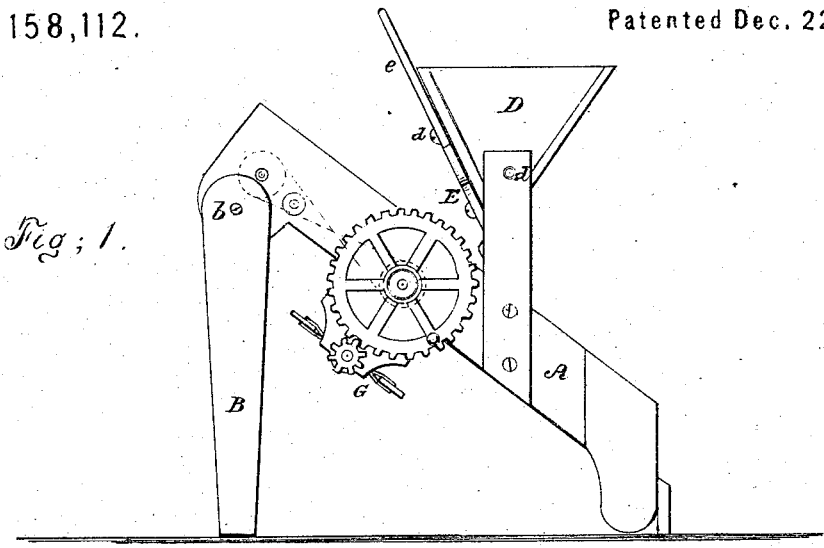
Fig; 1.
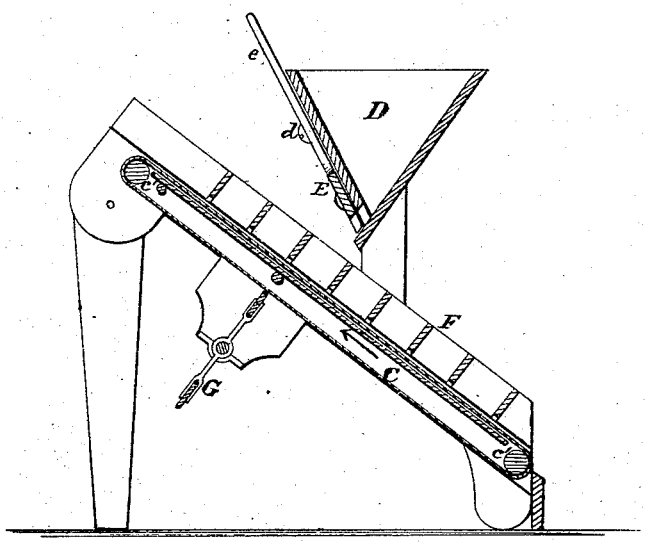
Fig; 2.
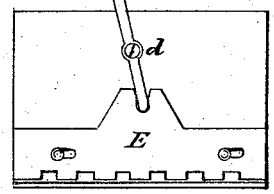
Fig; 3.
Witnesses:
Jo. C. Peyton.
E. C. Davidson.
Inventor:
Hiram Moore
by his Atty
Wm D. Baldwin

UNITED STATES PATENT OFFICE.

HIRAM MOORE, OF GREEN LAKE, WISCONSIN.

IMPROVEMENT IN OATS-SEPARATORS.

Specification forming part of Letters Patent No. 158,112, dated December 22, 1874; application filed June 10, 1872.

*To all whom it may concern:*

Be it known that I, HIRAM MOORE, of the town and county of Green Lake, in the State of Wisconsin, have invented a new and Improved Method of Separating Wild Oats from Tame Oats and other grain, of which the following is a specification:

The object of my invention is to obtain pure seed, and more especially to separate tame oats from wild oats.

Tame-oat kernels are comparatively smooth-surfaced, while wild oats usually have an enveloping bearded coat. The specific gravity of tame oats is much greater than that of wild oats, and if the seeds be caused to pass over an inclined apron having a napped surface the wild oats will adhere to it, while the tame oats will slide over it, thus simply and effectually separating the wild from a large portion of the tame oats.

The subject-matter claimed is fully specified hereinafter.

The accompanying drawings represent a machine embodying my improvements, in which Figure 1 is a side elevation; Fig. 2, a vertical longitudinal section, and Fig. 3 a view of the hopper and feed-slide.

I mount a frame, A, upon legs B, pivoted thereto at $b$, in order to adjust the inclination of the frame. An endless apron, C, preferably of Canton flannel or plush, traverses on rollers $c'$ $c'$ in this frame. A hopper, D, is mounted on journals $d$, on standards on the frame, so that the hopper and frame may be correspondingly adjusted to keep the sides of the hopper so steeply inclined as to insure the free discharge of the grain. A slide, E, operated by a hand-lever, $e$, regulates the discharge of the grain, which falls from the hopper upon the inclined apron C. The transverse partitions F above the apron form cells to catch the grain in its descent, and prevent it from bounding off the apron, the effect being that the grain strikes the walls of the cells, and falls gently upon the apron, which runs a slight distance below their lower edges. The grain thus gradually slides down upon the apron, while the wild oats are carried upward by it and dropped over its upper edge. A revolving beater, G, underneath the frame removes any adhering matter from the apron.

The apron and beater may be driven by the means shown in the drawing, which are so obvious as to need no description, or in other well-known ways.

It is obvious that an apron of skin, with the hair, fur, or wool on, might be used instead of cloth; but the latter is cheaper.

I claim as my invention—

In combination with the endless apron, composed of material having a napped surface, the cells placed over the inclined apron to check the grain falling from the hopper, substantially as set forth.

In testimony whereof I have hereunto subscribed my name.

HIRAM MOORE.

Witnesses:
 E. C. DAVIDSON,
 BALTIS DE LONG.